United States Patent [19]

Okubo et al.

[11] Patent Number: 4,458,642

[45] Date of Patent: Jul. 10, 1984

[54] LUBRICANT HEATING SYSTEM FOR INTERNAL COMBUSTION ENGINE

[75] Inventors: Akira Okubo, Tokyo; Seishi Miura, Shiki, both of Japan

[73] Assignee: Honda Giken Kogyo Kabushiki Kaisha, Tokyo, Japan

[21] Appl. No.: 373,718

[22] Filed: Apr. 30, 1982

[30] Foreign Application Priority Data

May 2, 1981 [JP] Japan ................... 56-67304

[51] Int. Cl.³ ............................................. F02M 1/00
[52] U.S. Cl. ............................. 123/196 AB; 123/557; 184/6.21; 184/6.22
[58] Field of Search ............ 123/196 AB, 196 R, 557; 60/320, 321; 184/6.21, 6.22

[56] References Cited

U.S. PATENT DOCUMENTS

| | | | |
|---|---|---|---|
| 1,545,956 | 7/1925 | Good | 184/6.22 |
| 1,788,117 | 1/1931 | Mettler | 123/196 AB |
| 1,895,503 | 1/1933 | Will | 123/196 AB |
| 1,904,429 | 4/1933 | Evans | 123/196 AB |
| 2,275,576 | 3/1942 | Ware | 123/196 AB |
| 2,824,724 | 2/1958 | Porsche | 123/196 AB |
| 3,855,980 | 12/1974 | Weisz et al. | 123/557 |

Primary Examiner—E. Rollins Cross
Attorney, Agent, or Firm—Armstrong, Nikaido, Marmelstein & Kubovcik

[57] ABSTRACT

Herein disclosed is a lubricant heating system for an internal combustion engine equipped with an exhaust pipe which is connected with a heat exchanger. This heat exchanger is constructed to include a communication passage, which communicates with the exhaust pipe so as to be heated by the engine exhaust gas, and a radiating unit which is disposed adjacent to the communication passage and contacts with the lubricant of the internal combustion engine thereby to heat the lubricant with the heat in the exhaust gas transferred from the communication passage. The heat exchanger thus constructed is adapted to promptly heat the lubricant, which is mixed with a fuel, by the use of the exhaust heat of the internal combustion engine, thus promoting the warm-up of the engine. Moreover, impurities such as the mixed fuel or water are evaporated and separated from the lubricant and are promptly discharged out as a blow-by gas.

6 Claims, 10 Drawing Figures

LUBRICANT HEATING SYSTEM FOR INTERNAL COMBUSTION ENGINE

BACKGROUND OF THE INVENTION

1. Field of the Invention

The present invention relates to a lubricant heating system for use with an internal combustion engine.

2. Description of the Prior Art

It takes a warming-up time of several minutes for an internal combustion engine of an automobile or the like to have its lubricant temperature raised to a sufficient level for its normal operation after it has been started. Moreover, the unevaporated fuel, which may steal into the air-fuel mixture sucked into a combustion chamber during the operation of the engine, may flow down a piston through a clearance, which is formed between the facing ends of a piston ring, during the compression stroke of the piston until it steals into the lubricant below a crankcase. This tendency is increased when the internal combustion engine is run at a cold place or when an alcohol fuel is used. Moreover, the lubricant, which has been mixed with the fuel, has its viscosity lowered to invite a disadvantage that its lubricating performance is degraded.

SUMMARY OF THE INVENTION

It is, therefore, a major object of the present invention is to provide a lubricant heating system for an internal combustion engine, which is enabled by the use of the heat in the exhaust gas of the internal combustion engine to promptly heat the lubricant, which has been mixed with a fuel, thereby to promote the warm-up of the engine and to evaporate and separate impurities such as the mixed fuel or water thereby to promptly discharge them as a blow-by gas.

Another object of the present invention is to provide a lubricant heating system of the aforementioned type, which is enabled to prevent the overheat of the lubricant by the heat in the exhaust gas thereby to prevent the lubricant from being degraded.

A further object of the present invention is to provide a lubricant heating system of the aforementioned type, which is made to have a simple construction but can enjoy excellent assemblability with an exhaust pipe.

In order to achieve the objects thus far described, according to the present invention, there is provided a lubricant heating system for an internal combustion engine equipped with an exhaust pipe, which system comprises a heat exchanger connected with said exhaust pipe and including a communication passage communicating with said exhaust pipe and heated by the exhaust gas flowing therein, and a radiating unit disposed adjacent to said communication passage and placed in contact with the lubricant of said internal combustion engine for heating said lubricant with such heat in said exhaust gas as is transferred from said communication passage.

The above and other objects, features and advantages of the present invention will become apparent from the following detailed description of several preferred embodiments when taken in conjunction with the accompanying drawings.

BRIEF DESCRIPTION OF THE DRAWINGS

FIGS. 1 to 4 show a first embodiment of the present invention, in which:

FIG. 1 is a longitudinally sectional side elevation showing an essential portion of an internal combustion engine which is equipped with a system of the present invention;

FIG. 2 is an enlarged longitudinal section showing a portion of FIG. 1;

FIG. 3 is an enlarged transverse section taken along line III—III of FIG. 1; and FIG. 4 is a view showing a portion of FIG. 3 with a leak valve being opened.

FIGS. 7 to 9 show a fourth embodiment of the present invention, in which:

FIG. 7 is a partially broken side elevation showing an internal combustion engine which is equipped with the system of the present invention;

FIG. 8 is a longitudinally sectional side elevation showing the system of the present invention; and FIG. 9 is a section taken along line IX—IX of FIG. 8.

DESCRIPTION OF THE PREFERRED EMBODIMENTS

Figure 1:
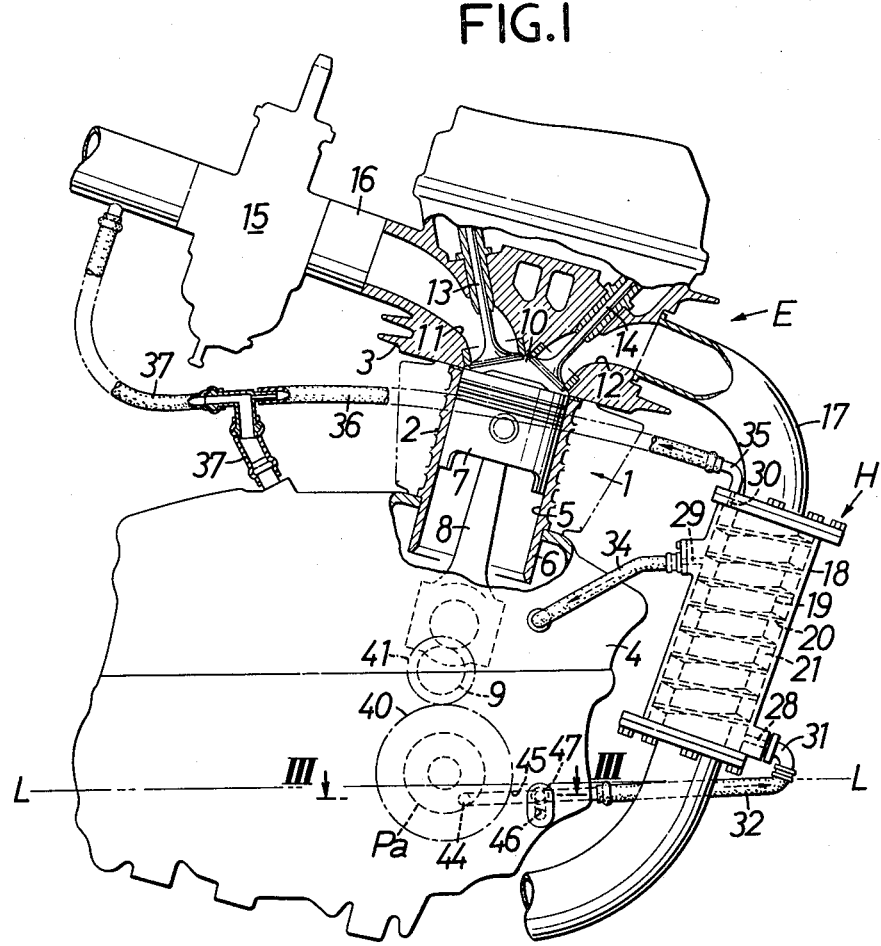

In the following description and the accompanying drawings, the identical or corresponding parts of various embodiments are indicated at identical reference characters.

First of all, FIGS. 1 to 4 show a first embodiment of the present invention.

FIG. 1 shows an internal combustion engine E which is equipped with a system according to the present invention and which has its body 1 equipped, as customary, with a cylinder block 2, a cylinder head 3 and a crankcase 4. In a cylinder sleeve 6 fitted in a cylinder bore 5 of the cylinder block 2, there is slidably fitted a piston 7 which is connected through a connecting rod 8 to a crankshaft 9. In the cylinder head 3, there are opened a combustion chamber 10, and intake and exhaust ports 11 and 12 which are to communicate with the combustion chamber 10 and adapted to be opened and closed by the actions of intake and exhaust valves 13 and 14, respectively. With the intake port 11, there is connected an intake pipe 16 which is equipped with a carburetor 15. With the exhaust port 12, on the other hand, there is connected an exhaust pipe 17.

Midway of this exhaust pipe 17, there is disposed a lubricant heater H.

Figure 2:
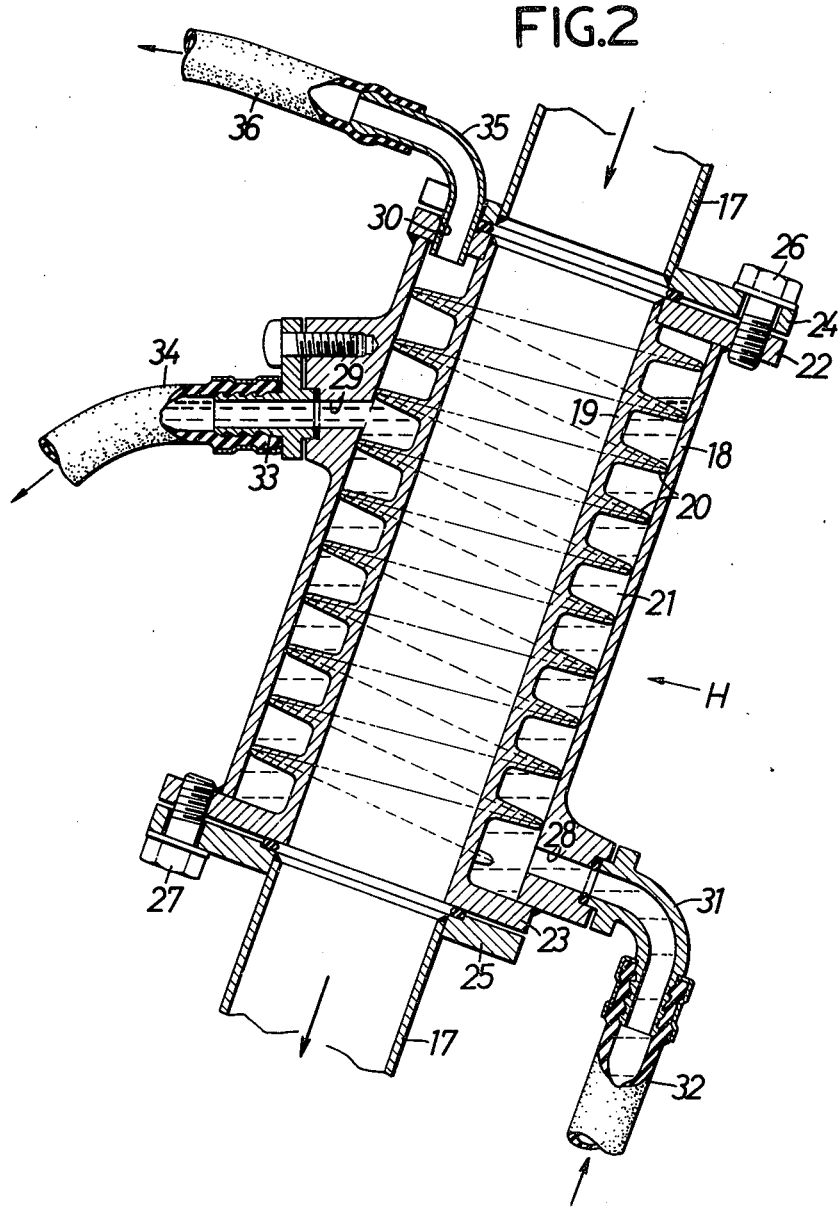

The construction of this lubricant heater H will now be described with main reference to FIG. 2. The heater H is constructed such that there is fitted in a cylindrical outer sleeve 18 an inner sleeve 19 which is integrally formed on its outer circumference with a helical fin 20 while leaving an annular heating chamber 21 and such that the inner and outer sleeves 19 and 18 are integrated by means of flanges 22 and 23 at their end portions. These end flanges 22 and 23 are integrally jointed by means of connecting bolts 26 and 27 to connecting flanges 24 and 25 which are formed on the aforementioned exhaust pipe 17 so that the exhaust gas having passed through the exhaust pipe 17 flows through the aforementioned inner sleeve 19.

At a lower portion of the heater H, there is opened a lubricant inlet port 28 which communicates with the aforementioned annular heating chamber 21. At a vertically intermediate portion of the heater body, on the other hand, there is opened a lubricant outlet port 29 which is made to communicate with the aforementioned heating chamber 21. At an upper portion of the aforementioned heater, moreover, there is opened a blow-by gas outlet port 30 which communicates with a gap formed at the top of the aforementioned heating chamber 21. The aforementioned lubricant inlet port 28 is connected through an elbow 31 with a flexible conduit 32, which in turn is connected, as will be detailed hereinafter, with an auxiliary oil pump Pa disposed in the crankcase 4. The aforementioned lubricant outlet port 29 is connected through a connecting pipe 33 with a flexible conduit 34, which in turn is made to communicate with the upper portion of the inside of the aforementioned crankcase 4. The aforementioned blow-by gas outlet port 30 is connected through an elbow 35 and a conduit 36 with the midway of a blow-by gas extracting pipe 37, which has its one end communicating with the top of the crankcase 4 and its other end communicating with the intake system of the engine so that the blow-by gas to be generated in the crankcase can be fed to the intake system of the engine.

Figure 3:
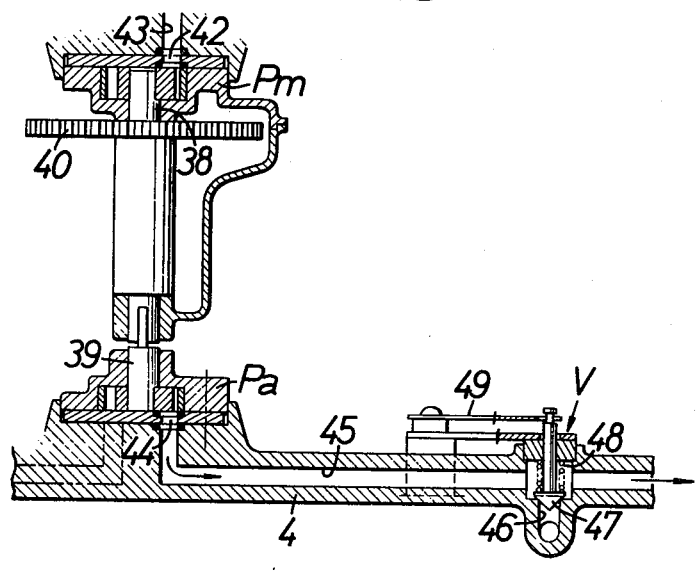

In the opposite inner walls of the crankcase 4, as shown in FIG. 3, there are mounted in a facing manner a main oil pump Pm and the aforementioned auxiliary oil pump Pa, which have their pump shafts 38 and 39 coaxially disposed and integrally connected. To the pump shaft 38, there is fixed a driven gear 40, which is in meshing with a drive gear 41 (as shown in FIG. 1) on the crankshaft 9, so that the main oil pump Pm and the auxiliary oil pump Pa are rotationally driven by the crankshaft 9.

The main oil pump Pm has its discharge port 42 communicating with a not-shown lubricating system by way of a lubricant passage 43, which is formed in the crankcase 4, thereby to feed the lubricant, as customary, to the portions to be lubricated such as the rotating or sliding portions of the engine.

On the other hand, the aforementioned auxiliary oil pump Pa has its discharge port 44 communicating with the lubricant inlet port 28 of the aforementioned heater H by way of both a lubricant passage 45 formed in the crankcase 4 and the conduit 32 so that it can feed the inside of the heating chamber 21 in the heater H with the lubricant in the crankcase 4.

Midway of the aforementioned lubricant passage 45, there is branched a leak passage 46, which has its branched portion equipped with a leak valve V for controlling the opening of that leak passage 46. The leak valve V is constructed to include a valve member 47 and a valve spring for biasing the valve member 47 in a closing direction. To the valve member 47, there is connected a temperature sensor 49 which is made of bimetal and is adapted to urge the valve member 47 to its open position, as shown in FIG. 4, against the spring force of the valve spring 48, when the temperature of the lubricant flowing through the lubricant passage 45 exceeds a predetermined level.

As shown in FIG. 1, the heater H is so arranged that its heating chamber 21 has its lowermost portion positioned above the upper limit level L—L of the lubricant in the crankcase 4.

Next, the operation of the first embodiment of the present invention having the construction thus far described will be described in the following. Now, when the internal combustion engine E is run, both the main oil pump Pm and the auxiliary oil pump Pa are driven by the rotation of the crankshaft 9 to pump up the lubricant in the crankcase 4 so that the pressurized lubricant from the main oil pump Pm flows through the lubricant passage 43, as customary, to lubricate the respective portions of the internal combustion engine E. On the other hand, the lubricant from the auxiliary oil pump Pa flows from the discharge port 44 thereof through the lubricant passage 45 and the conduit 32, while being guided to swirl by the helical fin 20, into the annular heating chamber 21 of the heater H. Moreover, the lubricant having reached the lubricant outlet port 29 in the heating chamber 21 is returned from said port 29 through the conduit 34 into the crankcase 4. Here, the lubricant having flown into the heating chamber 21 is promptly heated, while being swirled to rise therein, by the heat in the exhaust gas flowing in the exhaust pipe 17. In this case, the fin 20 formed on the inner sleeve 19 can promote the heating operation of the lubricant. By the aforementioned heating operation of the lubricant, the fuel and water contained therein are evaporated so that the evaporated fuel and water steam flow through the blow-by gass outlet port 30, the elbow 35 and the conduit 36 into the blow-by gas extracting pipe 37, from which they are supplied to the intake system of the internal combustion engine E. As has been thus far described, the lubricant can be promptly heated to promote the warm-up of the engine and to evaporate and separate the fuel content contained therein so that its expected lubricating function can be retained.

Figure 4:
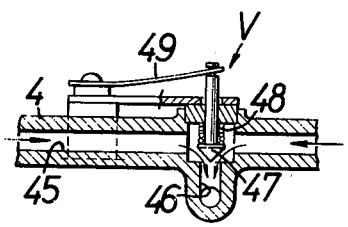

When the temperature of the lubricant is raised to a level (about 80° to 100° C.) during the hot running operation of the internal combustion engine after a continuous run, the temperature sensor 49 senses it to lift the valve member 47 against the elastic force of the valve spring 48, as shown in FIG. 4, until it opens the leak valve V. As a result, the lubricant flowing through the lubricant passage 45 fails to reach the heater H and is returned through the leak passage 46 into the crankcase 4. Thus, the lubricant is prevented from being degraded by the possible overheat. Moreover, the arrangement of the aforementioned heater H is made such that its heating chamber 21 has its lowermost portion positioned above the lubricant level in the crankcase 4. As a result, when the feed of the lubricant to the heating chamber 21 is blocked by the opening operation of the leak valve V during the hot running operation of the internal combustion engine E, as has been described in the above, the lubricant is not left in the heating chamber 21 but can be returned via the lubricant inlet port 28 and the conduit 32 into the crankcase 4. As a result, the lubricant left in the heating chamber 21 is not overheated and degraded. In the aforementioned embodiment, incidentally, the lubricant is fed to the heater H by the action of the auxiliary oil pump Pa but can be fed to the heater H by the use of the intrinsic lubricating oil pump.

Figure 5:
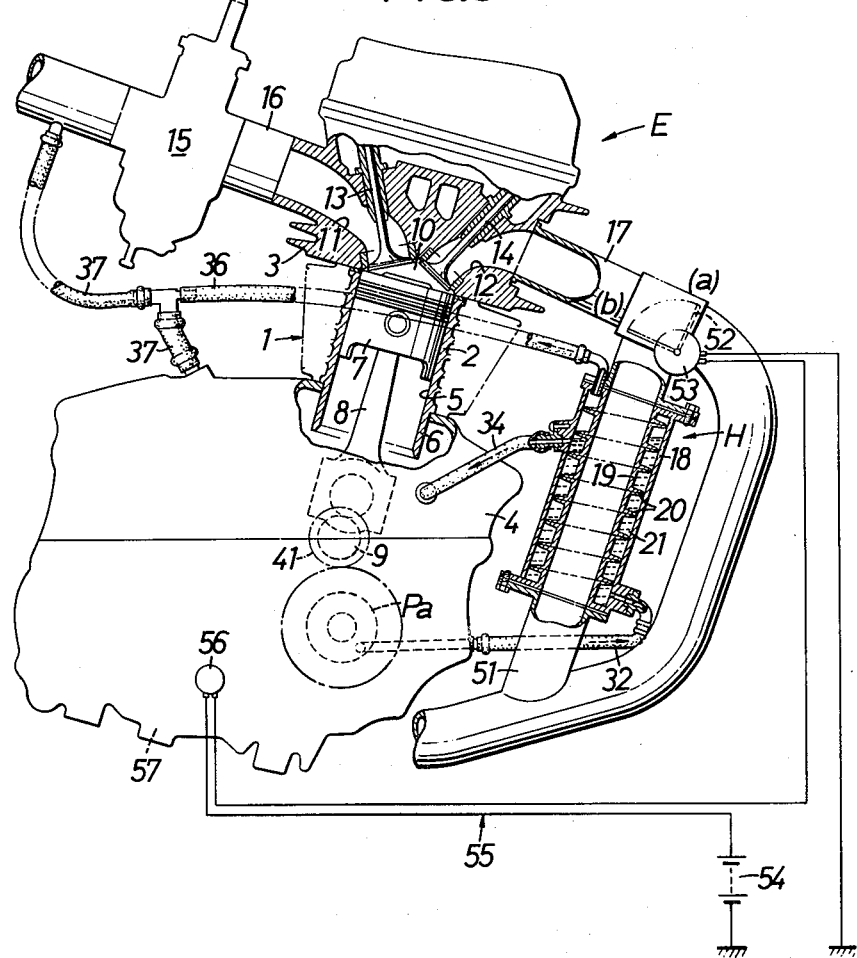
FIG. 5 is similar to FIG. 1 but shows a second embodiment of the present invention.

Turning now to FIG. 5 showing a second embodiment of the present invention, there is connected midway of the exhaust pipe 17 a bypass pipe 51, in which the heat exchanger H to be arranged at one side of the engine body 1 is disposed. The heat exchanger H has substantially the same construction as that of the foregoing first embodiment, and its detail description is omitted here. At the connecting portion between the exhaust pipe 17 and the bypass pipe 51, there is disposed a change-over control valve 52 which is enabled to open and close the exhaust pipe 17 and the bypass pipe 51.

The change-over control valve 52 has its actuator 53 connected with an electric control circuit 55 which in turn is connected with a power source 54. With that electric control circuit 55, there is connected a temperature sensor 56, which is disposed at a lower portion in the aforementioned crankcase 4 so that it may operate when it senses the temperature of the lubricant in an oil pan 57. When the lubricant temperature is not higher than the lower limit level, the temperature sensor 56 places the change-over control valve 52 at such a position (a) as is shown in FIG. 5 thereby to open the bypass pipe 51. When the lubricant temperature is raised to reach a predetermined level, on the other hand, the temperature sensor 56 turns the change-over control valve 52 counter-clockwise, as viewed in FIG. 5, to such a position (b) as also is shown in FIG. 5 thereby to close the bypass pipe 51.

It should be noted in this second embodiment that neither the leak passage 46 branched from the lubricant passage 32 nor the leak valve V for opening and closing the leak passage 46 is provided, which is different from the foregoing first embodiment.

The operation of the second embodiment will be described in the following. In a state where the internal combustion engine E has not yet been warmed up, for example, immediately after the starting thereof especially at a cold place, the temperature of the lubricant in the crankcase 4 is still low and the change-over control valve 52 takes the position (a) of FIG. 5, as has been described above, to leave the bypass pipe 51 open. As a result, the exhaust gas from the engine E flows through the bypass pipe 51 to promptly heat the lubricant having flowing into the heating chamber 21.

When the temperature of the lubricant in the crankcase 4 is raised to the predetermined level after the continuous run of the internal combustion engine E, on the contrary, the change-over control valve 52 takes the position (b) of FIG. 5, as has been described above, to block the bypass pipe 51 so that the exhaust gas does no longer flow into the bypass pipe 51. As a result, the lubricant is not overheated but is cooled down by the large radiating area of the heat exchanger so that it can be prevented from being degraded.

The construction and operation of the second embodiment other than the aforementioned ones are substantially similar to those of the foregoing first embodiment.

Figure 6:
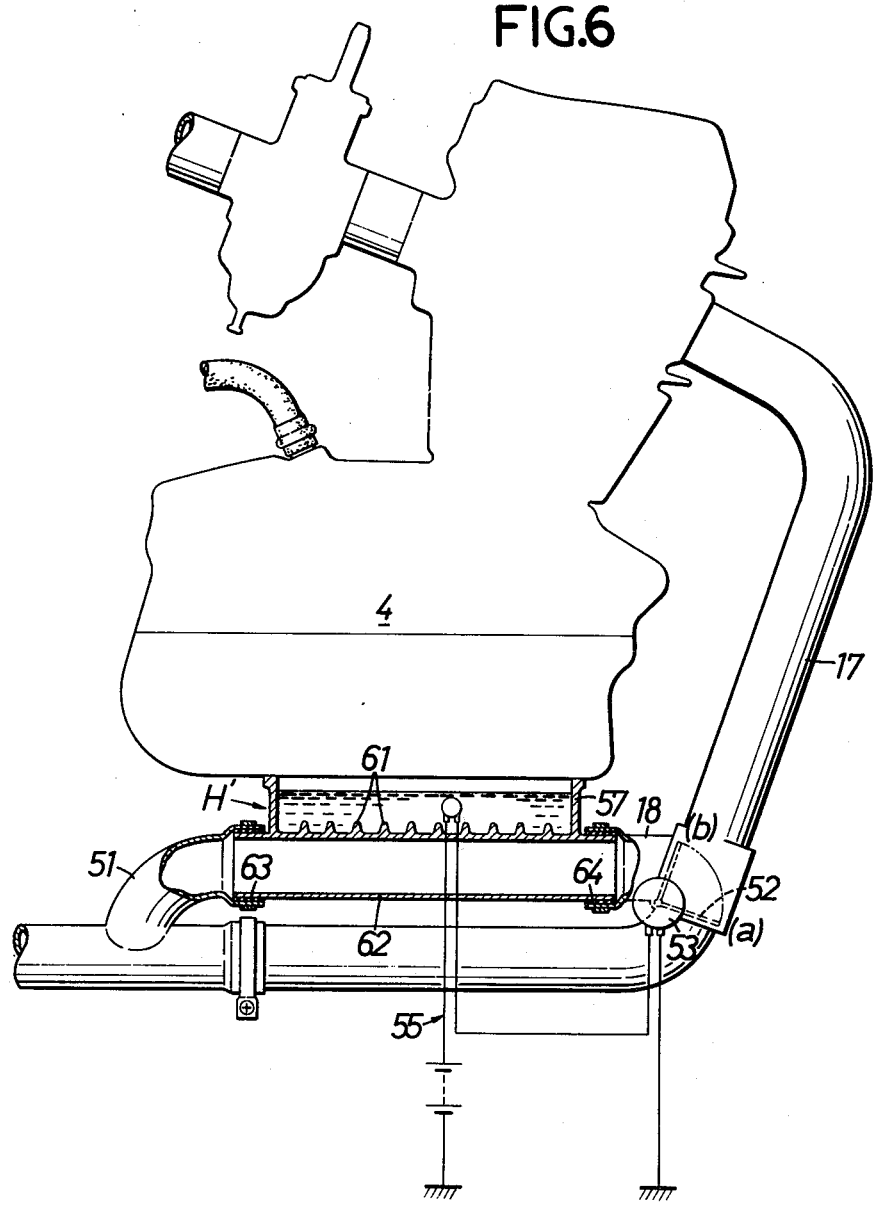
FIG. 6 is a partially longitudinally sectional side elevation showing a third embodiment of the present invention.

FIG. 6 shows a third embodiment of the present invention. In this third embodiment, the bypass pipe 51 for bypassing a portion of the exhaust pipe 17 is arranged below the oil pan 57 at a lower portion of the crankcase 4. Midway of the bypass pipe 51, there is disposed a heat exchanger H'. This heat exchanger H' is constructed at a cylindrical body 62 which is integrally formed on its upper surface with radiating fin 61 and which has both its ends hermetically connected to the midway of the bypass pipe 51 through packings 63 and 64. The upper surface of the aforementioned cylindrical body 62, which is formed with the radiating fins 61, constitutes a part of the bottom wall of the oil pan 57 at a lower portion of the crankcase 4 and directly contacts with the lubricant in the oil pan 57. At the connecting portion between the upstream end of the bypass pipe 51 and the exhaust pipe 17, there is disposed the change-over control valve 52 similarly to the foregoing second embodiment shown in FIG. 5. With the actuator 53 of that change-over control valve 52, there is connected the same electric control circuit 55 as that of the second embodiment so that the exhaust pipe 17 and the bypass pipe 51 can be controlled to be opened and closed.

When the lubricant temperature is low, the change-over control valve 52 is at the position (a) in FIG. 6, and the exhaust gas flows through the bypass pipe 51 so that the heat exchanger H' can directly heat the lubricant in the oil pan 57. When the lubricant temperature is raised to the predetermined level, on the contrary, the change-over control valve 52 is turned counter-clockwise to the position (b) of FIG. 6 so that the entrance of the bypass pipe 51 is closed to prevent the lubricant from being overheated.

Figure 7:
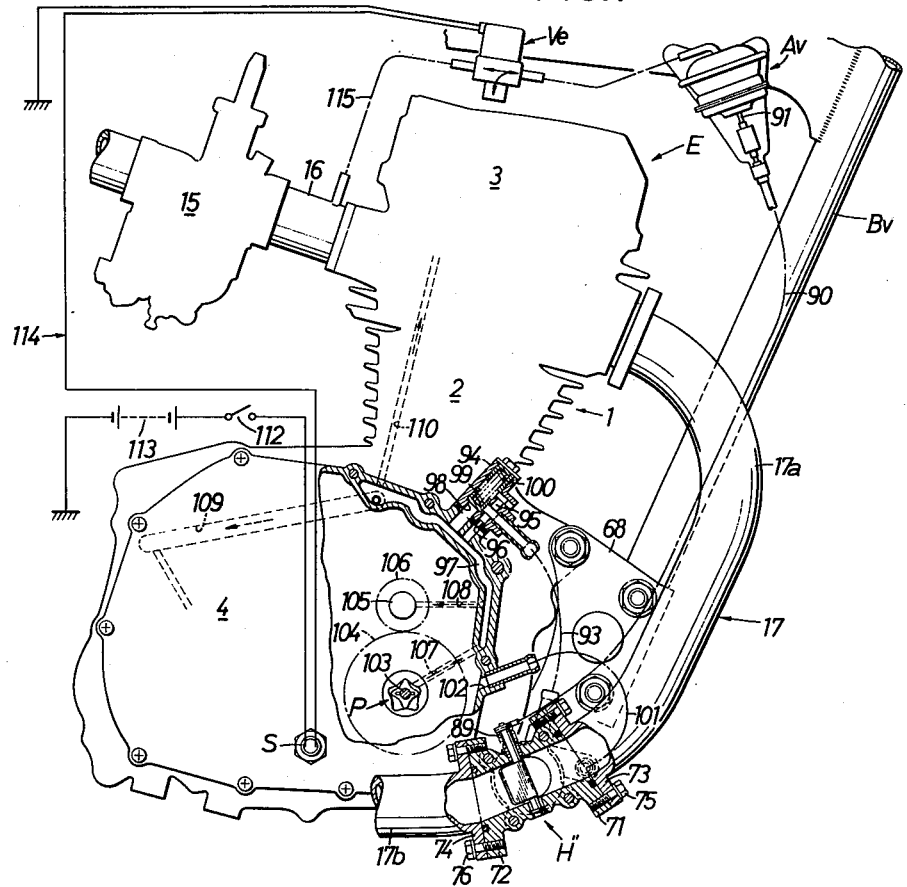
Figure 8:
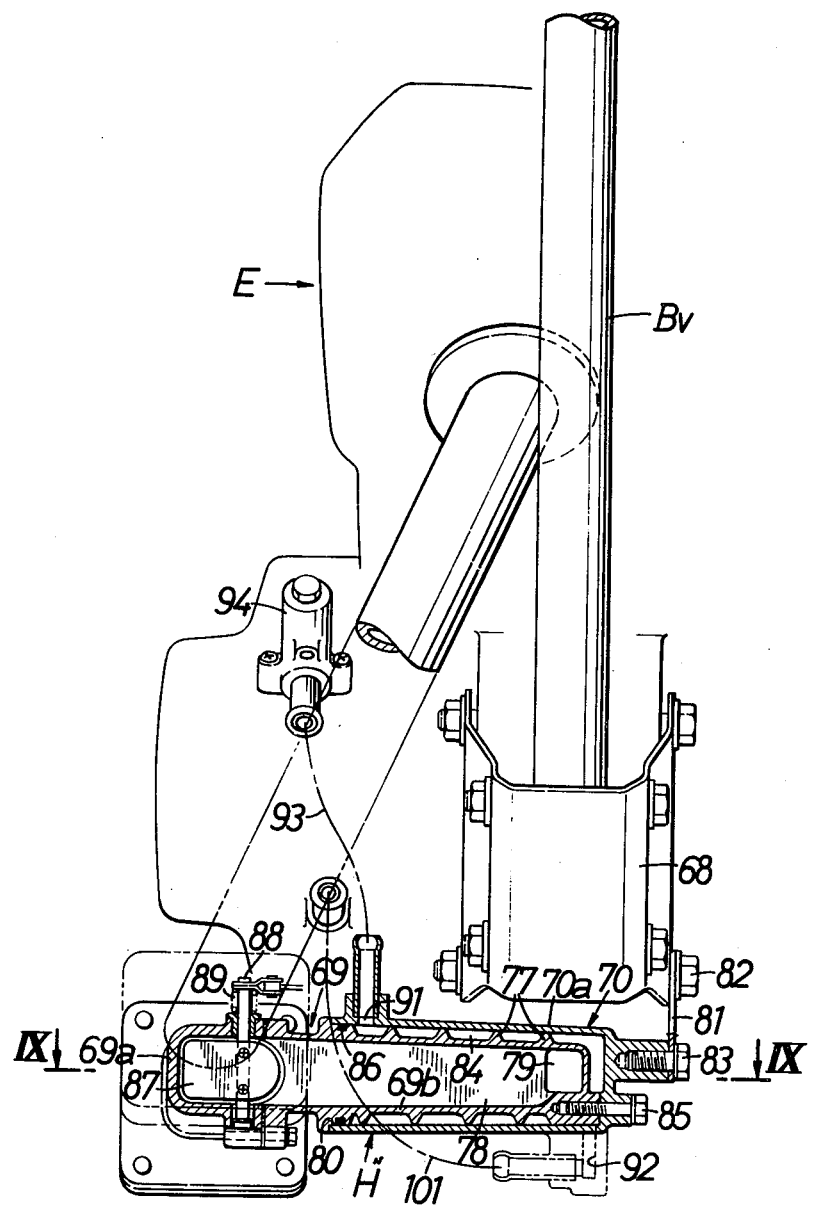
Figure 9:
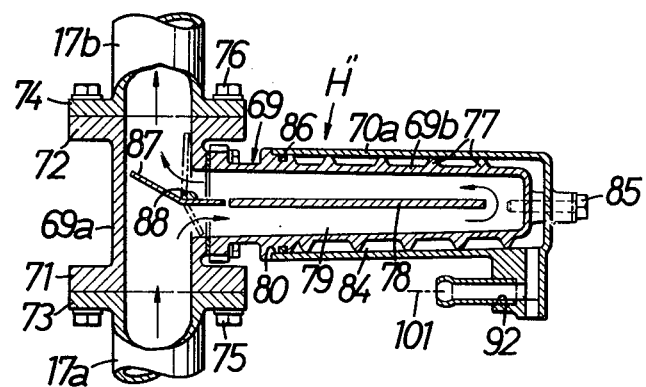

FIGS. 7 to 9 show a fourth embodiment of the present invention. In this fourth embodiment, the exhaust pipe 17 is divided into an upstream exhaust pipe 17a, which is connected to the exhaust port of the engine body 1, and a downstream exhaust pipe 17b which is opened into the atmosphere and which has a muffler (although not shown) disposed midway thereof. A lubricant heater H" is interposed between those upstream and downstream exhaust pipes 17a and 17b.

Next, the construction of that lubricant heater H" will be described in the following. This lubricant heater H" is constructed to include a heat radiating device 69, which is connected between the aforementioned upstream and downstream exhaust pipes 17a and 17b, and a heat receiving unit 70 which accommodates therein the heat radiating cylinder 69b of the heat radiating device 69. This heat radiating device 69 is constructed such that the heat radiating cylinder 69b having its outer end closed is integrally connected to one side of an exhaust communication pipe 69a, which has both its ends formed with end blanges 71 and 72 at a right angle with respect to the longitudinal axis thereof, and such that the exhaust communication pipe 69a and the heat radiating cylinder 69b have their insides communicating with each other.

The end flanges 71 and 72 of the aforementioned exhaust communication pipe 69a are integrally fixed by means of connecting bolts 75 and 76 to connecting flanges 73 and 74 which are integrally formed with the downstream end of the upper exhaust pipe 17a and the upstream end of the downstream exhaust pipe 17b, respectively. On the other hand, the aforementioned heat radiating cylinder 69b is formed on its outer circumference with a helical radiating fin 77. Inside of the heat radiating cylinder 69b, there is fixed along the axis thereof and at a spacing from the end wall thereof an exhaust guide plate 78, which forms a U-shaped exhaust communication passage 79 in the heat radiating cylinder 69b.

Moreover, the aforementioned heat receiving device 70 has its end portion equipped with a hollow heat receiving cylinder 70a which has its receiving end opened and its base portion fixed by means of fastening bolts 82 and 83 through a supporting member 81 on a supporting bracket 68 which supports the internal combustion engine E on a vehicular frame Br. In the aforementioned heat receiving cylinder 70a, there is received from the receiving end 80 thereof the heat radiating cylinder 69b so that a helical lubricant passage 84 is formed by the aforementioned radiating fin 77 between the heat receiving cylinder 70a and the heat radiating cylinder 69b. These heat receiving and radiating cylinders 70a and 69b are integrally fastened by means of a fastening bolt 85, and the receiving end 80 of the heat receiving cylinder 70a and the heat radiating cylinder 69b are hermetically sealed up by means of an O-ring 86. At the connecting portion between the exhaust communication pipe 69a and the heat radiating cylinder 69b, there is rotatably borne by means of a valve stem 88 a change-over valve 87 which is bent to have an angular section for opening and closing that connecting portion. That valve stem 88 is so biased by the action of a return spring 89, as shown in dotted line in FIG. 9, that it closes the connecting portion between the exhaust communication passage 69a and the heat radiating cylinder 69b. To the outer end of the aforementioned valve stem 88, on the other hand, there is bound one end of an operating wire 90, which has its other end connected to the operating lever 91 of a vacuum-operated actuator Av supported by a vehicular frame. As a result, when that actuator Av is operated, it tracts the operating wire 90 to turn the change-over valve 87, as indicated in solid lines in FIG. 9, thereby to open the aforementioned connecting portion. At the base and leading portions of the heat receiving unit 70, there are opened lubricant inlet and outlet ports 91 and 92 which are communicated with the lubricant communication passage 84. With that inlet port 91, there is connected a portion of a flexible lubricant supply pipe 93, which has its other end communicating with a lubricant outlet passage 95 formed in a valve casing 94 mounted on the crankcase 4. The aforementioned lubricant outlet passage 95 is made to communicate with a lubricant chamber 97, which is formed in the crankcase 4, by way of a fixed throttle 96. In the aforementioned valve casing 94, on the other hand, there is formed a relief passage 98 which provides communication between the lubricant chamber 97 and the lubricant outlet passage 95. That relief passage 98 is equipped with a relief valve 99 which is biased by the spring force of a valve spring 100 to normally close the communicating portion between the relief passage 98 and the lubricant outlet passage 95. The valve 99 is opened, when the oil pressure in the lubricant chamber 97 exceeds a predetermined level, against the spring force of the valve spring 100 thereby to establish communication between the relief passage 98 and the lubricant outlet passage 95.

With the lubricant outlet port 92 at the leading end of the heat receiving device 70, on the other hand, there communicates one end of a flexible recirculation passage 101, which has its other end communicating with a recirculation port 102 opened into the crankcase 4.

In this crankcase 4, there is disposed, as customary, an oil pump P for lubrication. To the pump shaft 103 of that oil pump P, there is fixed a driven gear 104, which is in meshing engagement with a drive gear 106 mounted on the crankshaft 9 so that the oil pump P is rotationally driven by the action of the crankshaft 9. An outlet passage 107 leading to the outlet port of the oil pump P is made to communicate with the aforementioned lubricant chamber 97. With this lubricant chamber 97, there are connected lubricant passages 108, 109 and 110 through which the lubricant is fed to respective portions of the internal combustion engine E to be lubricated, such as the transmission (although not shown) and the cylinder head 3.

At a lower portion of the crankcase 4, there is disposed a temperature sensor S for sensing the temperature of the lubricant reserved in the oil pump. The temperature sensor S is connected with an electric circuit 114, which in turn is connected through a switch 112 with a power source 113, so that it is turned off when the lubricant temperature exceeds a predetermined level to open the electric circuit 114.

With that electric circuit 114, moreover, there is connected the solenoid of an electromagnetic change-over valve Ve which will be described hereinafter.

With the intake pipe 16 of the internal combustion engine E downstream of the throttle valve, there is connected one end of a vacuum sucking pipe 115, which has its other end communicating with the vacuum-operated chamber of the aforementioned vacuum-operated type actuator Av, so that said actuator Av is operated when a vacuum is exerted thereupon to pull the aforementioned operating wire 90 against the spring force of a return spring 89 thereby to operate the aforementioned change-over valve 87 in an interchanging manner. Midway of the aforementioned vacuum sucking pipe 115, there is disposed the aforementioned electromagnetic change-over valve Ve, which either provides communication of the vacuum sucking pipe 115 or vents the same to the atmosphere.

When the temperature of the lubricant pump is still so low that it fails to reach the predetermined level, the lubricant temperature sensor S is conducting and the electric circuit 114 is closed to energize the solenoid of the electromagnetic change-over valve Ve so that the vacuum sucking pipe 115 is placed in its communicating state. When the lubricant temperature is raised to exceed the predetermined level by the running operation of the engine E, on the other hand, the temperature sensor S is turned off and the electric circuit 114 is closed to deenergize the solenoid of the electromagnetic change-over valve Ve so that the vacuum sucking pipe 114 is vented to the atmosphere.

Thus, both the aforementioned actuator Av and electromagnetic change-over valve Ve are positioned above the intake suction port of the intake pipe 16 to block the steal of the fuel droplets into the vacuum sucking pipe 115 or through said pipe 115 into the electromagnetic change-over valve Ve and further into the actuator Av so that this actuator Av can accurately operate at all times.

Next, the operation of this fourth embodiment will be described in the following. Now, when the internal combustion engine E is run, the oil pump P is driven by the rotation of the crankshaft 9 to pump the lubricant in the oil pump into the lubricant chamber 97. The lubricant in the lubricant chamber 97 is fed under pressure, as usual, through the lubricant passages 108, 109 and 110 to those portions such as the crankshaft 9, the transmission and the cylinder head 3 thereby to forcibly lubricate the same.

On the other hand, a portion of pressurized lubricant in the lubricant chamber 97 is circulated in the helical lubricant passage 84 via the fixed throttle 96, the lubricant outlet passage 95 and the lubricant supply passage 93 and is then returned via the recirculation passage 101 into the crankcase 4.

At the warming-up state of the engine E after it has been stated, however, the lubricant in the crankcase 4 is still at a low temperature (lower than 80° C.), and the electric circuit 114 is at its closed state to energize the solenoid of the electromagnetic change-over valve Ve so that the vacuum sucking pipe 115 is held at its communicating state. As a result, the intake vacuum in the intake pipe 16 is exerted through the vacuum suction pipe 115 upon the vacuum chamber of the actuator Av so that this actuator Av is operated to pull the operating wire 90, whereby the change-over valve 87 is opened as indicated in solid line in FIG. 9. Therefore, the exhaust communication pipe 69a and the heat radiating cylinder 69b of the heat radiating device 69 restore their communication so that the exhaust gas flowing through the exhaust pipe 17 is guided from the aforementioned exhaust communication pipe 69a through the heat radiating cylinder 69b by the action of the exhaust guide plate 78 to flow in the longitudinal direction thereof until it flows again through the exhaust communication pipe 69a into the exhaust pipe 17. As a result, the heat radiating cylinder 69b is heated by the heat in the exhaust gas so that it can heat not only the lubricant flowing through the lubricant passage 84 but also all the lubricant in a prompt manner. In this case, the helical fin 77 formed on the outer circumference of the heat radiating cylinder 69b serves to promote the heating operation of the lubricant.

When the lubricant in the lubricant reservoir in the crankcase 4 reaches a predetermined temperature (higher than 80° C.), the temperature sensor S is turned off and the electric circuit 114 is opened to deenergize the solenoid of the electromagnetic change-over valve Ve so that the vacuum suction pipe 115 is vented to the atmosphere. The actuator Av is rendered inoperative because of the interruption of the intake vacuum and the operating wire 90 is pushed by the action of the internal return spring thereby to close the change-over valve 87, as indicated in dotted line in FIG. 9. Consequently, the exhaust gas flowing through the exhaust communication pipe 69a fails to recirculate in the heat radiating cylinder 69b so that the lubricant in the heat radiating device 69 is not heated.

When the oil pressure in the lubricant chamber 97 exceeds a predetermined level, the relief valve 99 retracts against the spring force of the valve spring 100 to establish the communication of the relief passage 98 with the supply passage 93 so that the oil thus relieved flows from the relief passage 98 and the fixed throttle 96 through the downstream passage 93 into the aforementioned lubricant heater H″. After the oil has been heated by that heater H″, it is recirculated into the crankcase 4. Thus, it becomes possible to efficiently heat the lubricant.

According to this fourth embodiment, the lubricant heater H″ can be attached to the exhaust pipe 17 to enjoy an excellent assemblability merely by dividing the exhaust pipe 17 into the upstream downstream pipe 17a and the downstream exhaust pipe 17b and by connecting the exhaust communication pipe 69a of the heat radiating device 69 between those upstream and downstream exhaust pipes 17a and 17b. In case the exhaust pipe 17 is heated to a high temperature, moreover, its thermal expansion in the longitudinal direction is not blocked, and no thermal stress is produced in the exhaust pipe 17 or in the exhaust communication pipe 69a, the heat radiating cylinder 69b and the heat receiving cylinder 70a which constitute together the lubricant heater H″ so that they can be prevented in advance from being deformed.

Figure 10:
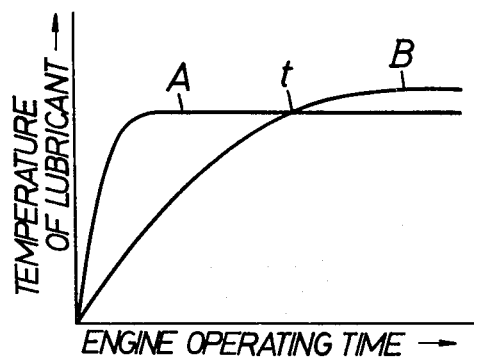
FIG. 10 is a graph illustrating the lubricant temperature rising characteristics of the present invention and the prior art.

FIG. 10 is a graph illustrating the characteristics in the temperature rise of the lubricant in accordance with the present invention. In this graph, the temperature of the lubricant is plotted against the operating time of the internal combustion engine. A curve A corresponds to the characteristics in the temperature rise of the lubricant in accordance with the present invention, whereas a curve B corresponds to the characteristics in the temperature rise of the lubricant in accordance with the prior art. As is apparent from that graph, the curve A steeply rises to indicate that a faster heating effect of the lubricant can be attained compared with the curve B of the prior art and that the lubricant temperature becomes substantially constant, after the lubricant temperature has reached an upper limit temperature t, so that the lubricant is not overheated even after the continuous operation of the engine and the so-called "oil cooling effect" can be obtained.

What is claimed is:

1. A lubricant heating system for an internal combustion engine equipped with an exhaust pipe which includes upstream and downstream exhaust pipes separated from each other, comprising a heat exchanger connected with the exhaust pipe, said heat exchanger including a communication passage being connected between said upstream and downstream exhaust pipes, and a radiating unit disposed adjacent to the communication passage and being in contact with the lubricant of the internal combustion engine for heating the lubricant with the heat in the exhaust gas transferred from the communication passage; said radiating unit comprising a heat radiating cylinder connected with the communication passage; a heat receiving cylinder accommodating there in said heat radiating cylinder; a lubricant communicating passage formed between the heat radiating and heat receiving cylinders for connected an oil pump and a lubricant reservoir both arranged in the crank case of the engine; and a change-over valve disposed in the connecting portion between the communication passage and the heat radiating cylinder, said change-over valve being controlled to be opened and closed in accordance with the temperature of the lubricant.

2. A lubricant heating system as set forth in claim 1, further comprising: a bypass pipe for bypassing a portion of said exhaust pipe; and a change-over control valve disposed at the connecting portion between said exhaust pipe and said bypass pipe for controlling said exhaust and bypass pipes to selectively open and close them, said heat exchanger being disposed in said bypass pipe.

3. A lubricant heating system as set forth in claim 1, wherein said heat exchanger is disposed directly in said exhaust pipe.

4. A lubricant heating system as set forth in claim 2 or 3, wherein said radiating unit includes a heating chamber formed to enclose said communication passage and having its lower portion communicating by way of a lubricant passage with an oil pump for pumping the lubricant in the crankcase of said engine, its vertically intermediate portion communicating with the upper portion of said crankcase, and its upper portion connected with a blow-by gas extracting pipe.

5. A lubricant heating system as set forth in claim 4, further comprising: a leak passage for providing communication between said lubricant passage and the inside of said crankcase; and a leak valve interposed between said lubricant passage and said leak passage for providing their communication at a higher temperature than a predetermined level.

6. A lubricant heating system as set forth in claim 5, wherein said heating chamber has its lowermost portion positioned above the upper limit level of the lubricant in said crankcase.

* * * * *